US007046130B2

(12) United States Patent
Kusano

(10) Patent No.: US 7,046,130 B2
(45) Date of Patent: May 16, 2006

(54) SYSTEM FOR MEDIATING SAFETY DRIVE INFORMATION, SAFETY DRIVE INFORMATION MEDIATING APPARATUS USED THEREIN AND METHOD FOR CONFIRMING SAFETY DRIVE INFORMATION

(75) Inventor: Yuji Kusano, Kyoto (JP)

(73) Assignee: Omron Corporation, Kyoto (JP)

( * ) Notice: Subject to any disclaimer, the term of this patent is extended or adjusted under 35 U.S.C. 154(b) by 147 days.

(21) Appl. No.: 10/724,393

(22) Filed: Dec. 1, 2003

(65) Prior Publication Data

US 2004/0160327 A1 Aug. 19, 2004

(30) Foreign Application Priority Data

Dec. 3, 2002 (JP) .......................... P2002-350576

(51) Int. Cl.
*B60Q 1/00* (2006.01)

(52) U.S. Cl. ...................... 340/439; 340/576; 340/988; 340/989; 340/539.13

(58) Field of Classification Search ................ 340/576, 340/439, 988, 989, 991, 995, 993, 996, 905, 340/539.13; 705/13, 4, 400; 701/117, 118, 701/200–213

See application file for complete search history.

(56) References Cited

U.S. PATENT DOCUMENTS 5,223,844 A * 6/1993 Mansell et al. ........ 342/357.07
6,615,130 B1 * 9/2003 Myr .......................... 701/117
6,868,386 B1 * 3/2005 Henderson et al. ............ 705/4
2002/0152115 A1 * 10/2002 Morita et al. ................ 705/13

FOREIGN PATENT DOCUMENTS

JP 2002-31884 A 10/2002

* cited by examiner

*Primary Examiner*—Anh V. La
(74) *Attorney, Agent, or Firm*—Foley & Lardner LLP

(57) ABSTRACT

A system for mediating safety drive information is provided, wherein a family or a managing company of a vehicle driver is able to confirm the safety of the driver with ease with a cellular phone or the like. The system comprises safety drive detecting terminals each installed in a vehicle for detecting the drive state with a plurality of sensors; user's safety confirming terminals each included in a predetermined contact address; and a safety drive information mediating apparatus, which judges whether or not a vehicle is in the safety drive state, after receiving detected sensor data from the safety drive detecting terminal by wireless, and then supplies either a message of the occurrence of an abnormal state or a message of a safety drive to the user's safety confirming terminal, in response to the confirmation of an abnormal drive state or a safety drive along with the receipt of a request of confirming the safety drive from the user's safety confirming terminal.

13 Claims, 7 Drawing Sheets

SYSTEM FOR MEDIATING SAFETY DRIVE INFORMATION, SAFETY DRIVE INFORMATION MEDIATING APPARATUS USED THEREIN AND METHOD FOR CONFIRMING SAFETY DRIVE INFORMATION

BACKGROUND OF THE INVENTION

1. Field of the Invention

The present invention relates to a system for mediating safety drive information, wherein safety drive information for each of contract motorcars is transmitted to a family and/or a management company for a driver of the corresponding motorcar via a safety drive information mediating apparatus. The present invention also relates to a method for confirming such safety drive information, a program and a storage medium, all of which are used for the system.

2. Description of the Related Art

In order that a family and/or a managing company for a driver of a motorcar receives safety drive information as to whether or not the motorcar is running in a safe drive state, it is traditionally necessary to confirm whether or not the driver is currently being in a safety drive state by keeping a direct contact with a driver's own cellular phone or the like. In this case, however, the driver himself has to be in communication with the family and/or the company by such a cellular phone in the driving state, thereby causing to induce a problem in the safety drive. If, moreover, the driver himself cannot make a call with the cellular phone due to a possible accident encountered, it is impossible to directly convey accident information to his family by such a cellular phone.

Normally, on the basis of a subjective view of the driver himself, such a family or management company receives only information that he is currently being in a safety drive state, and therefore the information cannot be always regarded as safety drive information on the basis of an objective data.

Regarding such a system for providing vehicle information including the safety drive information, a method of managing vehicles has been disclosed (see, for example, Japanese Unexamined Patent Application Publication No. 2002-318844). In this system, position information, velocity information, status information (i.e., information about the operation condition of an engine, an electrical system and a mechanical system), safety/crisis managing information and others are real-time collected from a motorcar, a synthetic management and analysis of the data thus collected allow the status of the vehicle management, the status of a traffic jam and the car drive state to be recognized, and further make it possible to promptly cope with the safety/crisis, so that a system for synthetically managing information about movable objects effectively used for various services can be provided. The information supplied from the system may provide data to a transportation trader, road controlling organization, automobile maker, road information provider or the like for a consideration, and also serves to supply individual information from the transportation trader, road controlling organization, or motorcar maker to each person in a vehicle. The real time information as for the vehicle drive operation can be used, for instance to estimate the insurance rate. In the above-mentioned prior art, moreover, among various bits of the information supplied from the motorcar, the air bag operation status, the acceleration due to the collision, the inclination of the car body (an inclination greater than a specific angle being regarded as a fall or tipping) and/or an emergency notice from a driver (a button operation or an alarm sound) is used. Since the information includes a vehicle abnormal status, the content of the emergence notice and others, a vehicle managing center or a road managing center is capable of coping with such an emergency state.

In the above-mentioned system, however, the transportation trader, road controlling organization, automobile maker, or road information provider is assumed to be an information receiver, and aims the post-usage of the data, so that the system cannot be regarded as a system which enables a family of the vehicle driver or a managing company thereof to confirm a safety drive in the current state.

Moreover, in the above-mentioned system of the prior art, it is assumed that information is collected by a computer or the like on the side of the information receiver. As a result, it is difficult for the family of the driver to securely ascertain the safety drive of the driver at anytime and at any location using the system of the prior art.

As described above, a system having a relatively larger scale in an office is regarded as an information receiver in the conventional system for providing the vehicle information including the safety drive information, thereby making it impossible to obtain safety drive information in which a driver is currently being in a safety drive state.

SUMMARY OF THE INVENTION

In view of the above-mentioned drawbacks in the prior art, the present invention aims to offer a relief measure. Accordingly, it is a first object of the present invention to provide a system for mediating safety drive information, wherein a family or a managing company for a vehicle driver is able to easily confirm the safety drive of the driver with aid of a cellular phone, a stationary telephone, a personal computer or the like.

It is a second object of the present invention to provide a system for mediating safety drive information, wherein message information is supplied from a family of a driver thereto, in which case, the information is supplied directly to the driver either as a sound or character information, if he is in a vehicle, or as message information, if the driver is outside of the vehicle and therefore if the family is unable to keep a direct contact with him.

In order to solve the above-mentioned problems, the present invention provides a system for mediating safety drive information comprising safety drive detecting terminals for detecting the drive state with a plurality of sensors in each of vehicles; user's safety confirming terminals possessed by users wishing to obtain the safety drive information for a specified vehicle; and a safety drive information mediating apparatus for applying a predetermined process to detected sensor data from said safety drive detecting terminals in said vehicles to supply information about the safety drive of said specified vehicle to a corresponding user's safety confirming terminal; wherein said system for mediating the safety drive information judges whether or not said vehicle is running in a safety drive state, and then supplies either a message of the occurrence of an abnormal state to a user's safety confirming terminal in a predetermined contact address when the abnormal drive state of said vehicle is confirmed, or a message of the safety drive of said vehicle to said user's safety confirming terminal when the safety drive of said vehicle is confirmed and when a request of confirming the safety drive is received from said predetermined contact address. In this system, the safety drive of a running vehicle may be detected by various sensors, and the safety drive may be further confirmed by the user's safety confirming terminal, so that the family or managing company of the driver is able to confirm the safety drive.

Furthermore, the confirmation of the safety drive of a vehicle is carried out by comparing the detected sensor data with a pre-specified detection sensor data. Such pre-specified detection sensor data in the case of the safety drive may be registered beforehand for each vehicle type. If the safety drive may be confirmed for a predetermined period by a third party, the sensor data in this case can also be used as standard data.

The safety drive can easily and securely be confirmed if a cellular phone, a stationary telephone or a personal computer is used as a user's safety drive confirming terminal. The safety drive information mediating apparatus may further include a function for charging a fee of providing the abnormal state or the safety drive information. In other words, the apparatus is further capable of carrying out the safety reporting service. In the fee-charging process, different service fees can be requested to the user in accordance with a safety drive information level of the vehicle from the safety drive information mediating apparatus to the user. In this case, a business method can be offered wherein, for instance, data detected in detail are supplied to the driver in a high-class motorcar with a high-priced service fee, whereas data simply detected are supplied to the driver in a motorcar priced to appeal to the general public with a reduced service fee. In addition, an alteration of the safety drive information level according either to the number of the sensors disposed in the vehicle or to the sensor detection content makes it possible to provide a higher value added by providing higher usable information to the user for the present system.

Furthermore, the safety drive information mediating apparatus includes a telephonic communication function, which is capable of exchanging a message between the safety drive detecting terminal and the user's safety confirming terminal. The telephonic communication function allows either a message to leave in the apparatus, or a communication service to be provided as a business.

Moreover, the present invention further provides a safety drive information mediating apparatus, a safety drive detecting terminal for detecting the running state of a vehicle with a plurality of sensors, a method for confirming safety drive information, a program and a storage medium.

As described above, in accordance with significant features of the present invention, accurate safety drive information can be obtained in order to receive information used for judging the safety drive of a vehicle from the sensors mounted therein.

In the case when an unforeseen accident occurs, accident information, such as event information of a sudden accident is automatically transmitted to a predetermined contact address, thereby making it possible to quickly cope with such an accident. Although the contact address is assumed to be the family or the managing company for the driver in the above description, no such limitations are required in the present invention, that is, the information can be transmitted to a police station, a hospital, an insurance company or the like in accordance with the information about the accident occurrence.

Moreover, a cellular phone on the market is used as a user's safety drive confirming terminal, thereby enabling the safety drive state to be confirmed, for example, by a family of the driver.

Moreover, the information message from the cellular phone, stationary telephone or personal computer can be transmitted to the driver via the safety drive information mediating apparatus, thereby enabling the message to be securely transmitted to the driver, even if he temporarily leaves his vehicle.

In accordance with the present invention, such a business method can be offered wherein, for instance, data detected in detail are supplied to the driver in a high-class motorcar with a high-priced service fee, whereas data simply detected are supplied to the driver in a motorcar priced to appeal to the general public with a reduced service fee. In such a business method, an alteration of the safety drive information level according either to the number of the sensors in the vehicle or to the sensor detection content makes it possible to provide a higher value added by providing higher usable information to the user for the present system.

Further objects, features and advantages of the present invention will become apparent from the following description of the preferred embodiments with reference to the accompanying drawings.

DESCRIPTION OF THE PREFERRED EMBODIMENTS

Referring now to the accompanying drawings, preferred embodiments of the present invention will be described in detail. In the description, moreover, it should be noted that no specific limitations are given, unless the size, material and/or shape of each of components and relative position thereof used in the embodiments is specified.

Figure 1:
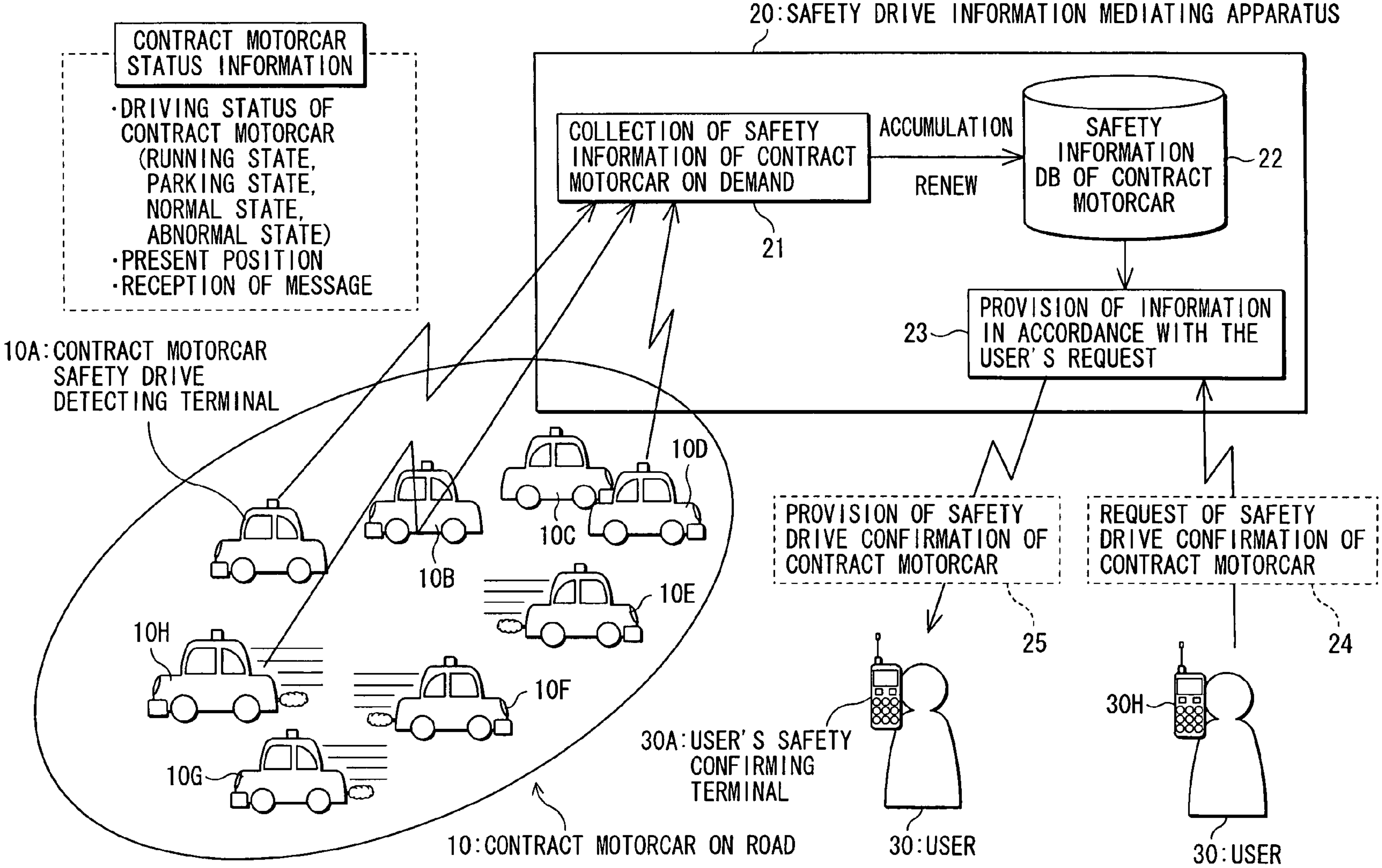
FIG. 1 is a conceptual diagram showing the function of a system for mediating safety drive information according to the invention.

FIG. 1 is a conceptual diagram showing the function of a system for mediating safety drive information according to the invention. The system comprises contract motorcar safety drive detecting terminals 10A–10H installed respectively in contract motorcars 10 on the road; a safety drive information mediating apparatus 20; and user's safety confirming terminals 30A–30H possessed by a user 30 wishing to obtain a safety information (in FIG. 1, only terminals 10A and 30H are shown). Each of the contract motorcar safety drive detecting terminals 10A–10H is communicated with the safety drive information mediating apparatus 20 via a wireless communication network (not shown). Furthermore, each of the user's safety confirming terminals 30A–30H is also interconnected to the safety drive information mediating apparatus 20 via a wireless communication network. Actually, an information appliance such as a cellular phone, a stationary telephone or a personal computer installed either in a home or in a managing company may be used as a user's safety confirming terminal 30A–30H.

Detection information from various sensors disposed in each vehicle in order to detect the vehicle status is accumulated in each of the contract motorcar safety drive detecting terminals 10A–10H included in the corresponding contract motorcars 10 on the road. The detection information includes, for instance, position information obtained by a sensor unit, GPS; vibration information obtained by a vibration sensor; impact information obtained by an impact sensor; velocity information obtained by a velocity sensor; and others. On basis of the detection information, a central control section disposed in each contract motorcar carries out a predetermined process for confirming the safety in order to extract the safety drive information. The safety drive information thus extracted is transmitted to the safety drive information mediating apparatus 20 at a specified timing. The safety drive information used herein includes not only data in the steady state, for instance, those as to whether or not the contract motorcar is in the drive state; whether or not the motorcar stops; whether or not the vehicle is in a regular mechanical state; and others, but also an event information as to whether or not an impact whose intensity is greater than a predetermined value occurs, i.e., an accident information, and further information about the present position of the vehicle, an information requesting information as to whether or not a driver requests the receipt of a message, and others.

The safety drive information supplied from each of the contract motorcar safety drive detecting terminals 10A–10H is stored at any time in the safety drive information mediating apparatus 20 as a safety drive information of the contract motorcar, as indicated by reference numeral 21. The collection of the safety drive information is carried out by telephonic communication means, as described below. The safety drive information thus collected is stored in an information database 22 as safety drive information for each contract motorcar, after renewed. As described above, the safety drive information includes not only data in the steady state, i.e., those as to whether or not the contract motorcar is in the drive state; whether or not the motorcar stops; whether or not the vehicle is in a regular mechanical state; and others, but also an event information as to whether or not an impact whose intensity is greater than a predetermined value occurs, so that information can be provided in accordance with the user's request of confirming whether or not the accident occurs (in which case, the user is indicated by reference numeral 30), as represented by reference numeral 23. In other words, a safety drive confirming service for confirming the safety of a driver can be supplied to a family or a managing company for the driver. In this case, various detection data of indicating the current status of the vehicle are supplied from the sensors in the vehicle to the safety drive information mediating apparatus 20, so that the data content to be provided can be segmented in accordance with a contract with the user. In other words, it is possible to set a larger charging rate of service for providing data detected in greater detail as well as to set a reduced charging rate of service for providing data simply detected.

On the other hand, the safety drive information mediating apparatus 20 receives an individual safety drive confirmation request 24 by specifying one of contract motorcars 10A–10H from user's safety confirming terminals 30A–30H, each of which is possessed by one of the users 30. After receiving the request, the safety drive information of the specified vehicle, for instance, 10A, which information is accumulated in the safety information database 22 of the contract motorcar, is supplied from the safety drive information mediating apparatus 20 to the corresponding user's safety confirming terminal 30A. The safety drive information is displayed as safety confirming information, i.e., the specified vehicle 10 being in a safety drive state on a display section of a cellular phone, if, for example, a cellular phone is used as a user's safety confirming terminal 30A, and thus the safety drive information supply 25 is carried out.

Figure 2:
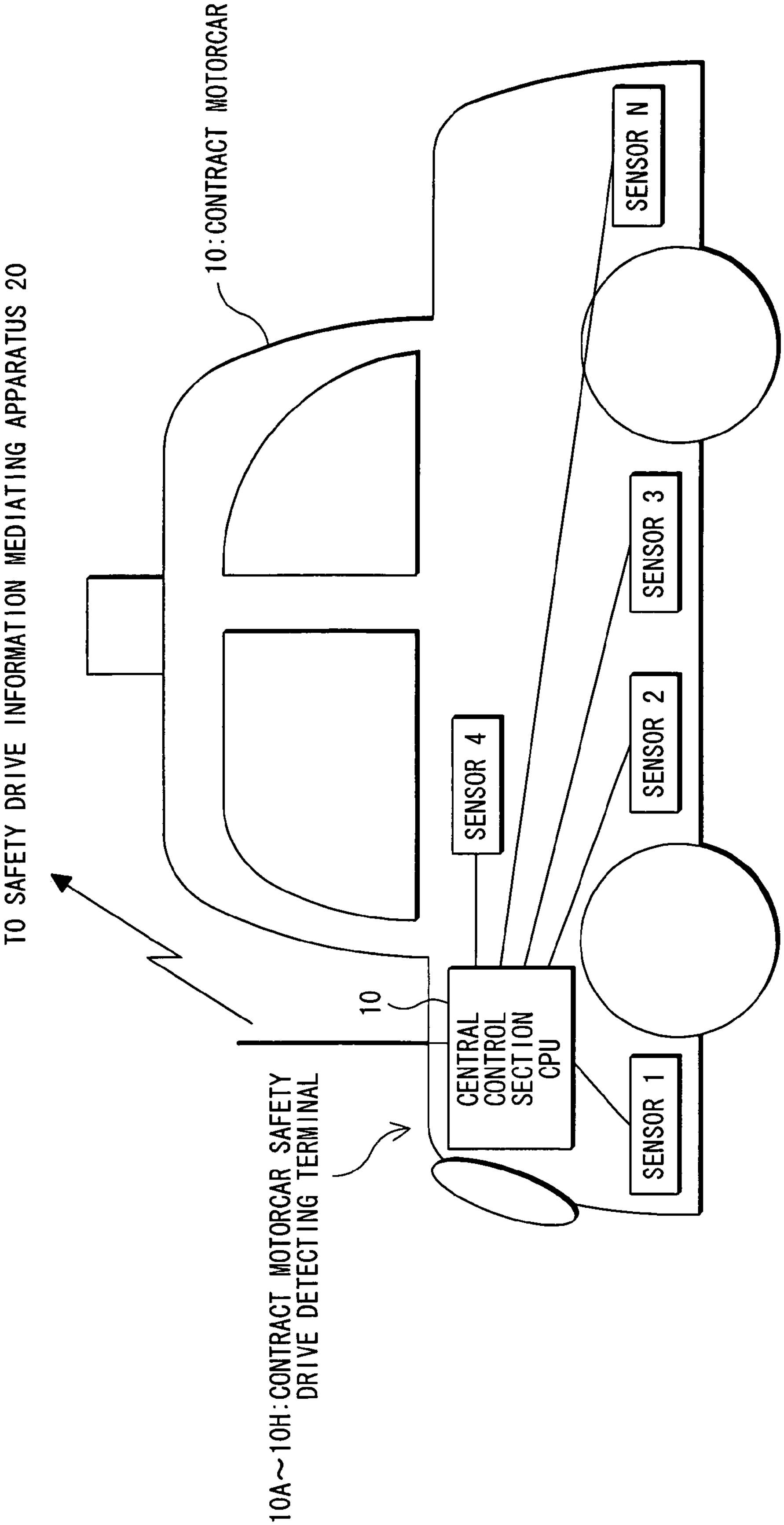
FIG. 2 is a schematic side view of a contract motorcar on the road wherein safety drive detecting terminals for contract motorcars shown in FIG. 1 are mounted onto the corresponding contract motorcars respectively.

FIG. 2 is a schematic side view of a contract motorcar 10 on the road wherein safety drive detecting terminals 10A–10H for contract motorcars 10 shown in FIG. 1 are mounted onto the corresponding contract motorcars, respectively. Various sensors 1–N are mounted onto the vehicle: For instance, a position sensor including a GPS, a vibration sensor for detecting the vibration of the car body, an impact sensor disposed at the front of the car body, a velocity sensor mounted on a velocity meter, temperature sensors mounted on several parts of an engine, voltage/current sensors adapted to various parts of the electrical system, and others. When the information resulting from such a sensor fulfills a predetermined condition, the central control section CPU 10 judges that the corresponding vehicle is in a normal operation condition. In an actual method of judgment, the normal operation state is ascertained if the output value of the sensor is within a predetermined range. In the judgment, either the usage of the if/then format according to the prior art can be beforehand assigned, or the fussy theory can be applied thereto. It can be empirically foreseen that the sensor output property is within a predetermined range, so long as the car type is specified beforehand. Accordingly, the sensor conditions in the safety drive can be determined by the prior art. In conjunction with this, another method of judgment can be applied: The judgment as to whether the contract motorcar is in the normal state or in the abnormal state is carried out in each of the safety drive detecting terminals 10A–10H as a local terminal, and, for the purpose of cost reduction, it is possible that the data in the abnormal state occurrence is supplied to the safety drive information mediating apparatus 20 only if the abnormal state is sensed. Otherwise, it is possible that raw data of a sensor are transmitted to the safety drive information mediating apparatus 20 in a predetermined time interval, and the judgment of the normal/abnormal state is carried out therein.

Figure 3:
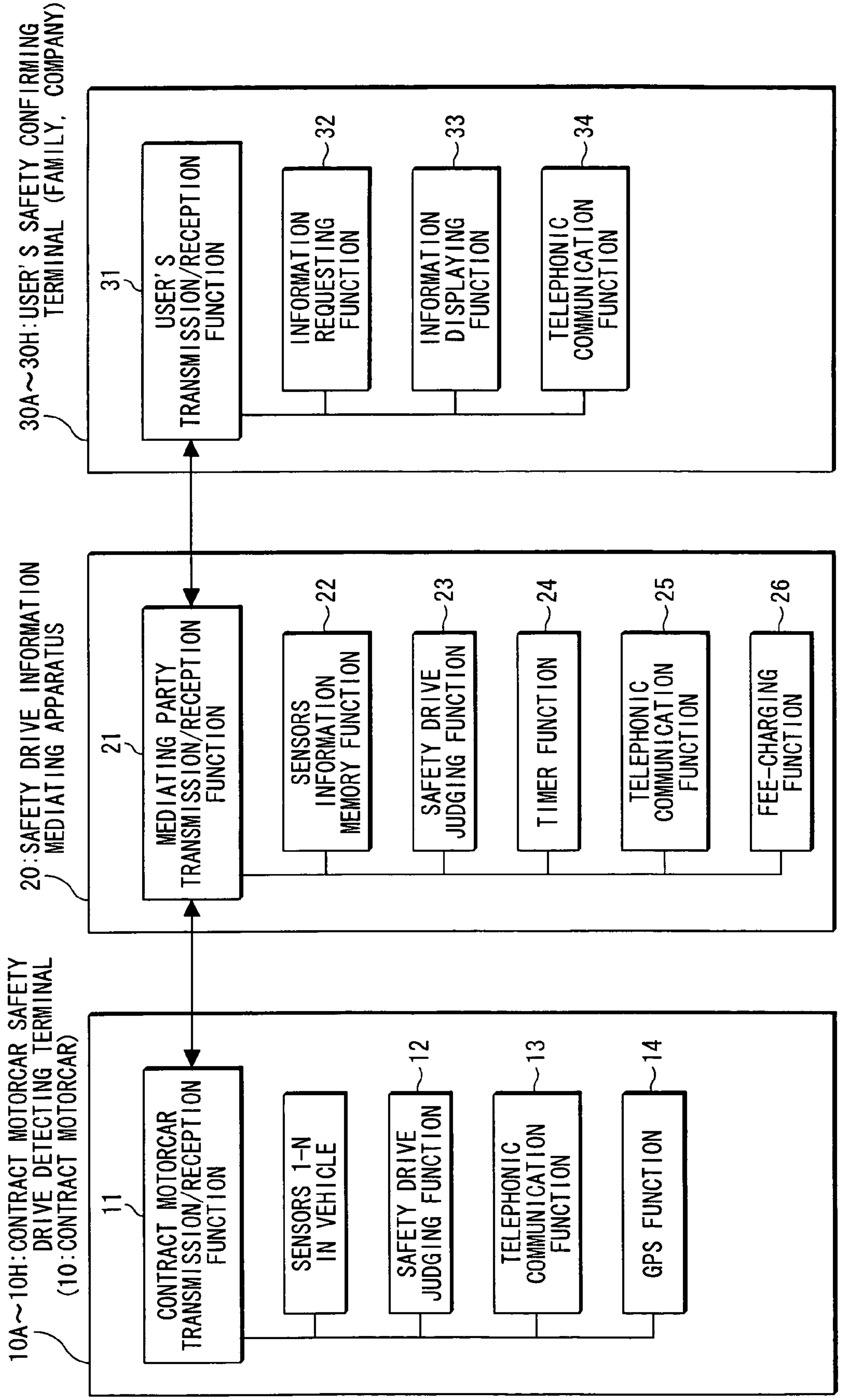
FIG. 3 is a block diagram showing functions which are included respectively in a contract motorcar safety drive detecting terminal disposed in each of contract motorcars, a safety drive information mediating apparatus and a user's safety drive confirming terminal used by a family or a managing company for a driver.

FIG. 3 is a block diagram showing functions which are included respectively in one of contract motorcar safety drive detecting terminals 10A–10H disposed respectively in contract motorcars 10, and in a safety drive information mediating apparatus 20, and further in one of user's safety drive confirming terminals 30 used by a family or a managing company for a driver. As described above, the contract motorcar 10 has a contract motorcar transmission/reception function 11 for transmitting data to the safety drive information mediating apparatus 20. The contract motorcar transmission/reception function 11 allows a contract motorcar to be communicated with the safety drive information mediating apparatus 20 either directly by wireless, or via a computer communication network, such as the Internet. The detailed description of such communication means is omitted, because a corresponding system in the prior art can be applied thereto. However, it should be noted that specific ID information is assigned to each of contract motorcars 10, and therefore, on the basis of the ID information, it can be ascertained with what contract motorcar 10 the safety drive information mediating apparatus 20 communicates. The detection data output from the sensors 1-N shown in FIG. 2 are supplied to the safety drive judging function 12, and then on the basis of a condition judgment in the if/then format, it is judged as to whether or not the vehicle is running in a stable state. Moreover, a telephonic communication function 13 is disposed in each of the contract motorcar safety drive detecting terminals 10A–10H, thereby enabling the Internet telephone function to be used for the telephonic communication request from a user's terminal. In addition, the GPS function 14 allows the present location to be determined. Accordingly, if it is judged that a contract motorcar is running in a region outside of a predetermined range, the occurrence of an abnormal state can be ascertained, thereby enabling the accident location to be easily determined when the accident occurs.

The safety drive information mediating apparatus 20 has a mediating party transmission/reception function 21. With aid of this function, the safety drive information mediating apparatus 20 periodically or suddenly receives either sensor information or safety drive information from a contract motorcar safety drive detecting terminal 10A–10H. Consequently, the apparatus 20 is capable of supplying emergency information to a user's safety confirming terminal 30A–30H possessed by his family or managing company, when an abnormal state occurs. Moreover, even when the safety state is maintained, the apparatus 20 supplies to the user's safety confirming terminal 30A–30H a message that the contract motorcar is running in a safety state, if the apparatus 20 receives a safety confirming request from the terminal 30A–30H. In addition, the safety drive information mediating apparatus 20 has a sensor information storage function 22 for storing sensor information supplied from a sensor as well as a safety drive judging function 23 similar to the safety drive judging function 12 of the contract motorcar safety drive detecting terminal 10A–10H, when raw sensor information is supplied from the above-mentioned contract motorcar, and therefore, on the basis of the information from various sensors, the safety drive information mediating apparatus 20 judges whether or not the corresponding contract vehicle is running in a safety state. Moreover, on the basis of a timer function 24, the safety drive information is periodically supplied to the user's safety confirming terminal 30A–30H. Telephonic communication function 25 in the safety information mediating apparatus 20 serves to provide a communication between a contract motorcar and a user, as similarly to the telephonic communication function 13 in the contact motorcar safety drive detecting terminal 10A–10H. In particular, the function 25 provides such a telephonic communication via the Internet. Moreover, the safety information mediating apparatus 20 has a fee-charging function 26 for charging the fee of the service for providing the safety drive information to the user. The charging of the fee is carried out for the ID of each user's safety confirming terminal.

In the present invention, it is possible that the exchange of information between the user's safety confirming terminal 30A–30H and the safety drive information mediating apparatus 20 is carried out, either directly, using a cellular phone of the user's safety confirming terminal 30A–30H, or via the Internet, using a personal computer in the driver's home. The user's transmission/reception function 31 is regarded as a data receiving function in a conventional cellular phone, and the information request function 32 is regarded as a function for requesting safety drive confirmation or abnormal state information in the safety drive judging function 12 or 23 by specifying the ID of a specific contract motorcar. Moreover, the user's safety confirming terminal 30A–30H has an information display function 33 for visually displaying the received information of the safety drive confirmation or abnormal state, and the terminal also has a telephonic communication function 34.

Figure 4:
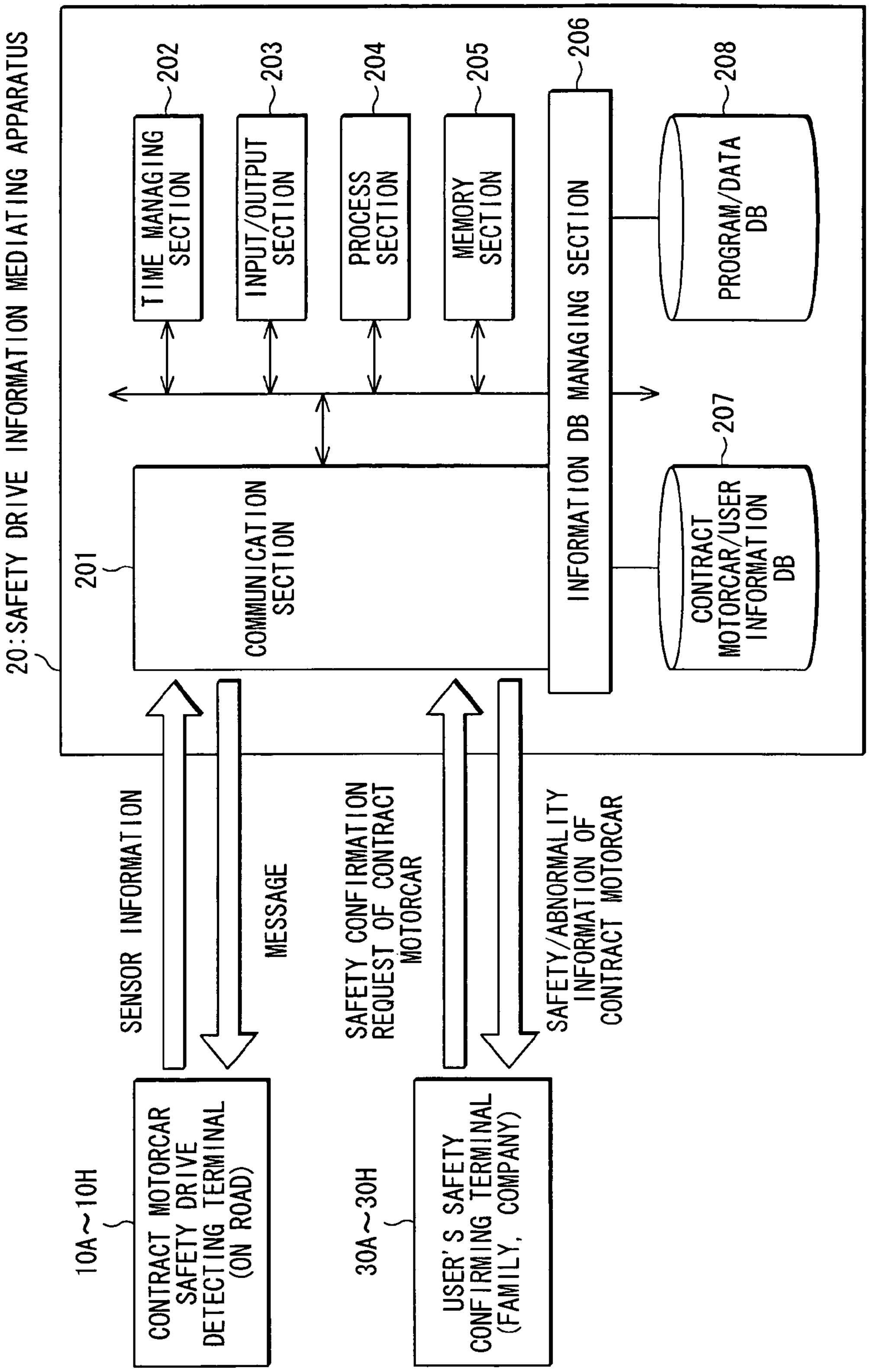
FIG. 4 is a block diagram showing the hardware in a safety drive information mediating apparatus.

FIG. 4 is a block diagram showing the hardware in the safety drive information mediating apparatus 20. A communication section 201 in the apparatus 20 has an interface function for providing a communication between the contract motorcar safety drive detecting terminal 10A–10H and the user's safety confirming terminal 30A–30H, and therefore it includes a network connecting function and/or data transmission/reception function for the cellular phone. Accordingly, information about the safety drive or abnormal state can be supplied either to a contact address, if the user 30 requests the confirmation of safety drive, or to a pre-registered contact address, when an abnormal state suddenly occurs in the contract motorcar 10. Time managing section 202 is used to receive sensor information or safety information from a contract motorcar at each predetermined time interval as well as to supply safety drive information or abnormal state information to the user's safety confirming terminal 30A–30H. Input/output section 203 serves to the management of various data to be input/output, and process section 204 is used to judge the safety drive or the occurrence of the abnormal state in response to the information supplied from the sensors. Memory section 205 serves to manage the ID of the above-mentioned contract motorcar 10 or the user 30 and to accumulate the sensor information, the fee-charging information in the charging process and others. Information DB managing section 206 serves to manage contract motorcar/user information DB 207 and program/data DB 208 used to store a program for confirming the safety on basis of the sensor information as well as to store the ID information. On the basis of the above-mentioned hardware, it is possible to receive sensor information from the contract motorcar safety drive detecting terminal 10A–10H and to supply information about the safety state or abnormal state to the user's safety confirming terminal 30A–30H in response to the request of confirming the status of the contract motorcar as well as information about the occurrence of the abnormal state due to an accident suddenly occurred.

Figure 5:
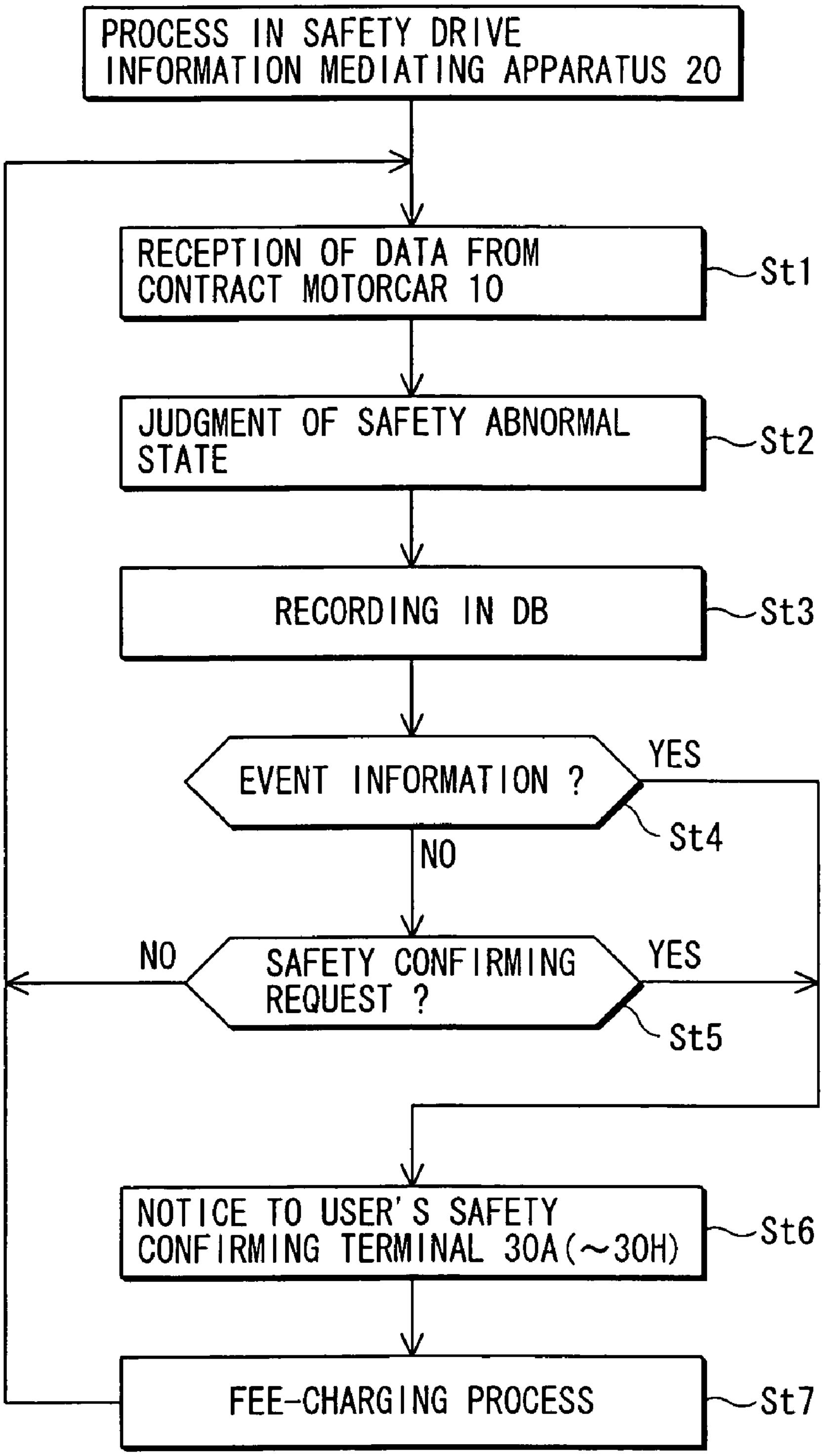
FIG. 5 is a flowchart showing the function of the safety drive information mediating apparatus, which plays an essential role in the system for mediating safety drive information according to the invention.

FIG. 5 is a flowchart showing the function of the safety drive information mediating apparatus 20, which plays an essential role in the system for mediating the safety drive information according to the invention. Firstly, detection data sensed by sensors disposed at various parts of a vehicle, position data thereof and others are periodically received from the contract motorcar 10 (St1). On the basis of the received data, it is judged as to whether the vehicle is running in a safety state or in an abnormal state (St2). The judgment is executed by comparing the data with pre-specified safety drive data, as described above. Then, the results of judgment are stored in a database (St3). If event information about the occurrence of an accident is included in the results of judgment (St4), information about the occurrence of the abnormal state is supplied to a pre-registered user's safety confirming terminal, for example, 30A as for the vehicle (St6), and a charging of the fee for providing the information to the user 30 is carried out (St7). Similarly, if a confirmation of safety drive is requested from a user 30 even in the case of no event information about the occurrence of an accident or the like (St5), information about the occurrence of the abnormal state is supplied to a pre-registered information distribution address, for example, a user's safety confirming terminal 30A (St6), and then the fee-charging process is executed (St7). Otherwise, the safety drive information mediating apparatus 20 waits for the data reception from contract motorcars, after returning to St1. Although a detailed description of the other flows is omitted, a service of supplying a message from the user's safety confirming terminal 30A–30H to a contract motorcar 10 is also carried out via the safety drive information mediating apparatus 20.

Figure 6:
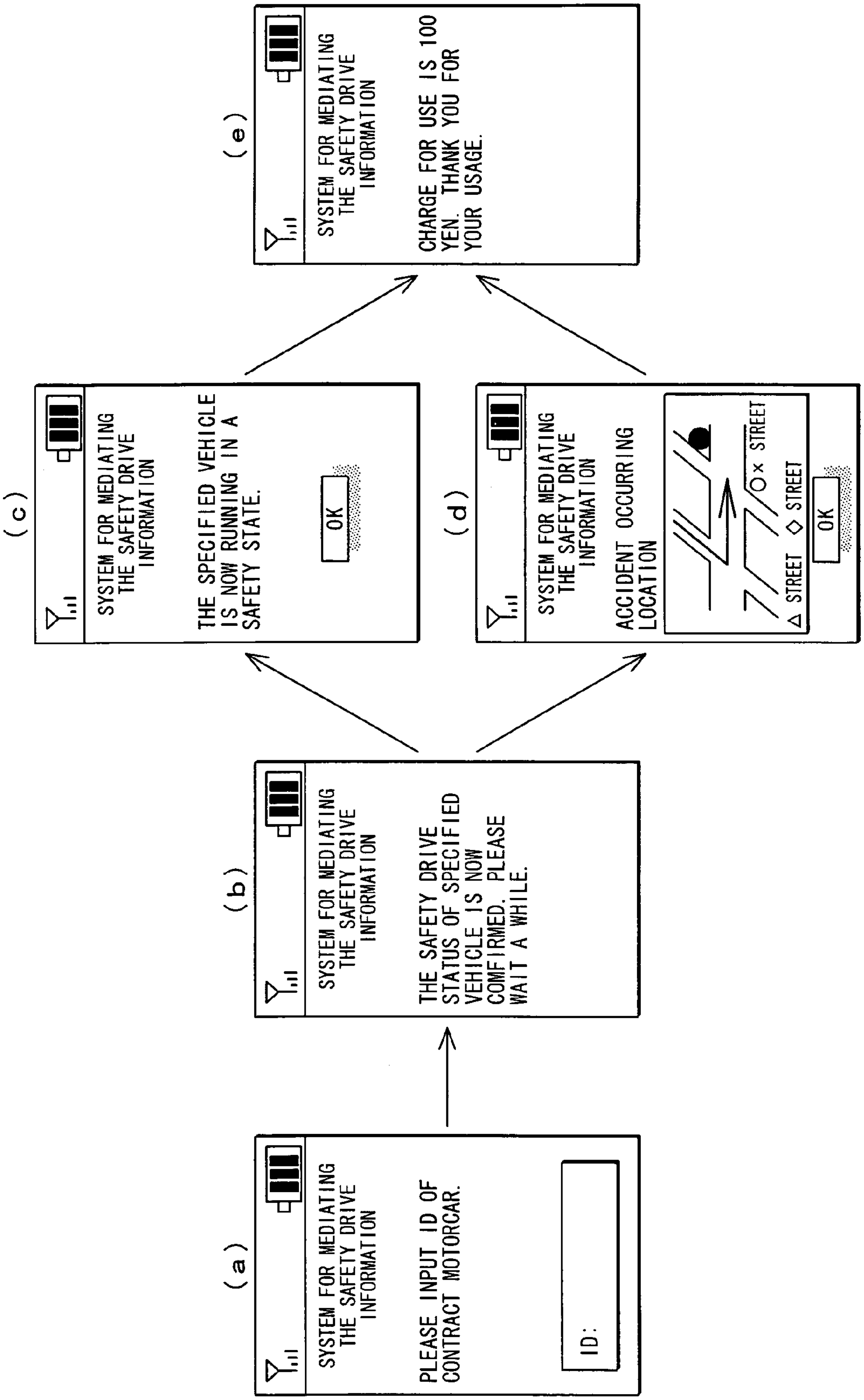
FIGS. 6(*a*) to 6(*e*) show a series of displayed images on a user's safety drive confirming terminal in the case where each of cellular phones on the market is used as such a terminal and when the confirmation of a safety drive is requested by a user.
Figure 7:
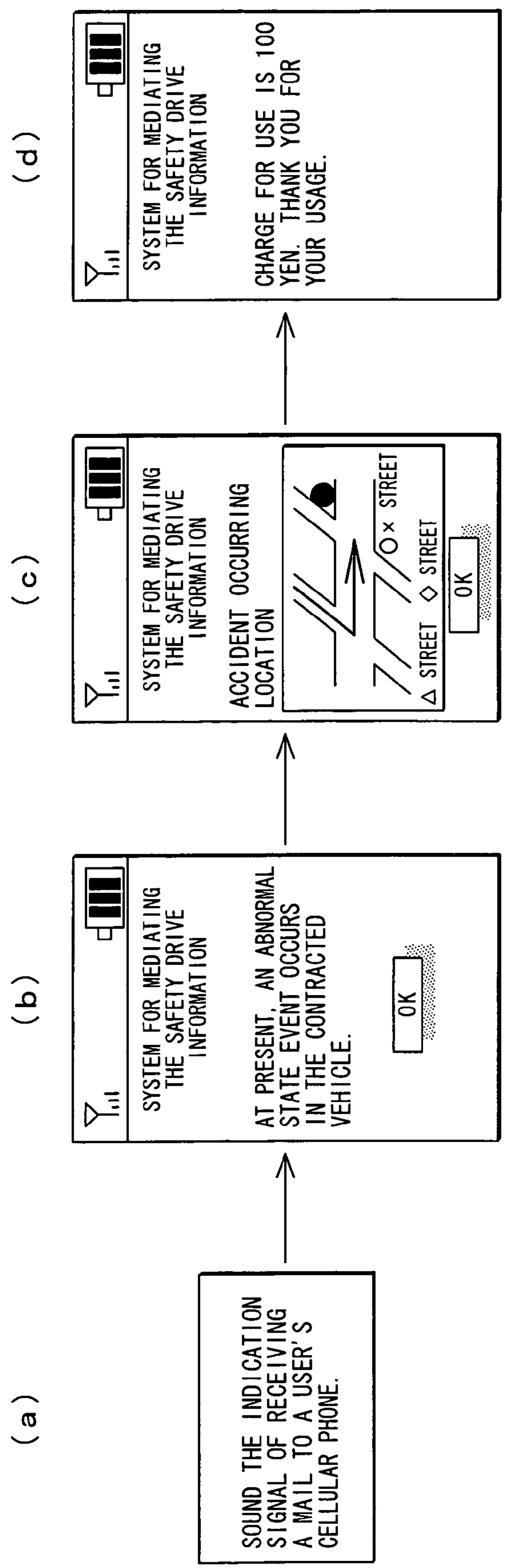
FIGS. 7(*a*) to 7(*d*) show a series of displayed images on a user's safety drive confirming terminal in the case where each of cellular phones on the market is used as such a terminal and when an emergence information is supplied from the safety drive information mediating apparatus.

FIGS. 6(*a*) to 6(*e*) show a series of displayed images on a user's safety drive confirming terminal 30A–30H in the case where each of cellular phones on the market is used as such a terminal and when the confirmation of a safety drive is requested by a user. As shown in FIG. 6(*a*), the user 30 is requested so as to input the ID number of a vehicle, the safety drive of which is to be confirmed. In this case, inputting a password of the user can be requested in order to protect his privacy. Then, the ID input is supplied to the safety drive information mediating apparatus 20, and an image is being displayed until information about the safety drive status of the vehicle is obtained (FIG. 6(*b*)). If the safety drive is confirmed, this is displayed on the display section of a cellular phone (FIG. 6(*c*)), and the resulted fee of providing the information is also displayed (FIG. 6(*e*)). On the contrary, if the safety drive is not confirmed and, at the same time, if event information about the occurrence of an accident is received, the information about the occurrence of the accident and the location at which the accident occurs are supplied (FIG. 6(*d*)). Furthermore, FIGS. 7(*a*) to 7(*d*) show a series of displayed images on a user's safety drive confirming terminal in the case where each of cellular phones on the market is used as such a terminal and when an emergence information is supplied from the safety drive information mediating apparatus. In this case, ID as shown in FIG. 6(*a*) is not input, and a mail of reporting the occurrence of an accident is transmitted from the safety drive information mediating apparatus 20 to the user's safety confirming terminal 30A–30H (cellular phone, stationary telephone, personal computer or the like).

Similarly, the telephonic communication request from a user's safety confirming terminal is also visually displayed, and the telephonic communication service is provided after requesting the ID of communication partner, so that the fee-charging process is carried out.

While preferred embodiments have been shown and described, various modification and substitutions may be made without departing from the spirit and scope of the invention. Accordingly, it is to be understood that the present invention has been described by way of examples, and not by limitations.

What is claimed is:

1. A system for mediating safe driving information, said system comprising:

safe driving detecting terminals for detecting a driving state with a plurality of sensors in each of a plurality of vehicles;

user's safety confirming terminals possessed by users wishing to obtain the safe driving information for a specified vehicle; and a safe driving information mediating apparatus for applying a predetermined process to detected sensor data from said safe driving detecting terminals in said vehicles to supply information about the safe driving of said specified vehicle to a corresponding user's safety confirming terminal;

wherein said system for mediating the safe driving information judges whether or not said specified vehicle is running in a safe driving state, and then, depending on the judging, supplies either a message of the occurrence of an abnormal driving state to a user's safety confirming terminal in a predetermined contact address when the abnormal driving state of said vehicle is confirmed, or a message of the safe driving of said vehicle to said user's safety confirming terminal when the safe driving of said vehicle is confirmed and when a request of confirming the safe driving is received from said predetermined contact address.

2. A system for mediating safe driving information according to claim 1, wherein the judgment as to whether or not said vehicle is running in a safe driving state is executed either in said safe driving detecting terminal included in each vehicle, or in said safe driving information mediating apparatus.

3. A system for mediating safe driving information according to claim 1, wherein the confirmation of the safe driving of said vehicle is carried out by comparing said detection sensor data with pre-specified detection sensor data in the case of the safe driving.

4. A system for mediating safe driving information according to claim 1, wherein said user's safety confirming terminal is a cellular phone, a stationary telephone or a personal computer.

5. A system for mediating safe driving information according to claim 1, wherein said safe driving information mediating apparatus has a fee-charging process function used to charge the fee of providing the information about the abnormal driving state or the safe driving of said vehicle.

6. A system for mediating safe driving information according to claim 5, wherein a varied service fee is required by said fee-charging process in accordance with the level of safe driving information supplied from said safe driving information mediating apparatus to said user.

7. A system for mediating safe driving information according to claim 6, wherein said level of safe driving information is varied either by the number of sensors disposed in said vehicle or by the detection content of said sensors.

8. A system for mediating safe driving information according to claim 1, wherein said safe driving information mediating apparatus has a telephonic communication function between said safe driving detecting terminal and said user's safety confirming terminal.

9. A system for mediating safe driving information according to claim 1, wherein the users possessing the user's safety confirming terminals are the families of the drivers of the vehicles.

10. A safe driving information mediating apparatus, said apparatus comprising:

first means for judging whether or not a vehicle is running in a safe driving state on the basis of detection sensor data received by wireless from a plurality of vehicles, each of which is equipped with a safe driving detecting terminal for detecting the driving state with sensors; and second means capable of supplying, depending on the judging, either a message of the occurrence of an abnormal driving state to a user's safety confirming terminal in a predetermined contact address when the abnormal driving state of said vehicle is confirmed, or a message of the safe driving of said vehicle to said user's safety confirming terminal when the safe driving of said vehicle is confirmed and when a request of confirming the safe driving is received from said predetermined contact address.

11. A method for confirming safe driving information of a vehicle, said method comprising the steps of:

detecting the driving state data of said vehicle with a plurality of sensors;

judging from the detected driving state data whether or not said vehicle is running in a safe driving state; and supplying, depending on the judging, either a message of the occurrence of an abnormal driving state to a predetermined contact address when the abnormal driving state of said vehicle is confirmed, or a message of the safe driving of said vehicle to said predetermined contact address when the safe driving of said vehicle is confirmed and when a request of confirming the safe driving is received from said predetermined contact address.

12. A program for confirming safe driving information of a vehicle, said program comprising:

a first memory section for detecting the driving state data of said vehicle with a plurality of sensors;

a second memory section for judging from the detected driving data whether or not said vehicle is running in a safe driving state; and a third memory section for supplying, depending on the judging, either a message of the occurrence of an abnormal driving state to a predetermined contact address when the abnormal driving state of said vehicle is confirmed, or a message of the safe driving of said vehicle to said predetermined contact address when the safe driving of said vehicle is confirmed and when a request of confirming the safe driving is received from said predetermined contact address.

13. A storage medium including a program for confirming safe driving information of a vehicle, said storage medium comprising:

first means for detecting the driving state data of said vehicle with a plurality of sensors;

second means for judging from the detected driving state data whether or not said vehicle is running in a safe driving state; and third means for supplying, depending on the judging, either a message of the occurrence of an abnormal driving state to a predetermined contact address when the abnormal driving state of said vehicle is confirmed, or a message of the safe driving of said vehicle to said predetermined contact address when the safe driving of said vehicle is confirmed and when a request of confirming the safe driving is received from said predetermined contact address.

* * * * *